United States Patent
Almeida et al.

(10) Patent No.: US 9,522,618 B2
(45) Date of Patent: Dec. 20, 2016

(54) SEAT COMPRISING A STRUCTURE FOR ARM SUPPORT

(71) Applicants: EMBRAER S.A., São José dos Campos/SP (BR); UNIVERSIDADE FEDERAL DE SÃO CARLOS (UFScar), São Carlos, SP (BR); USP—UNIVERSIDADE DE SÃO PAULO, São Paulo (BR)

(72) Inventors: Amanda Mota Almeida, São Paulo (BR); Fabio Sugimoto, São José dos Campos (BR); Fausto Leopoldo Mascia, São Paulo (BR); Felipe Mujica, São Paulo (BR); Flavia Renata Dantas Alves Silvia Ciaccia, Sãp José dos Campos (BR); Isabela Gallego, São Paulo (BR); Laerte Idal Sznelwar, São Paulo (BR); Samuel Henrique Sabadine da Cruz, São Paulo (BR); Victor D'afonseca de Silva, São Paulo (BR)

(73) Assignees: EMBRAER S.A., São José dos Campos-SP (BR); UNIVERSIDADE FEDERAL DE SÃO CARLOS UFScar, São Carlos, SP (BR); USP—UNIVERSIDADE DE SÃO PAULO, São Paulo (BR)

( * ) Notice: Subject to any disclaimer, the term of this patent is extended or adjusted under 35 U.S.C. 154(b) by 0 days.

(21) Appl. No.: 14/561,469

(22) Filed: Dec. 5, 2014

(65) Prior Publication Data

US 2015/0165944 A1    Jun. 18, 2015

(30) Foreign Application Priority Data

Dec. 17, 2013   (BR) .......................... 102013032476-0

(51) Int. Cl.
*A47C 7/42*      (2006.01)
*B60N 2/46*     (2006.01)
(Continued)

(52) U.S. Cl.
CPC .............. *B60N 2/4626* (2013.01); *A47C 1/12* (2013.01); *A47C 7/54* (2013.01); *A47C 7/543* (2013.01); *B60N 3/004* (2013.01)

(58) Field of Classification Search
CPC ............ A47C 7/70; A47C 1/03; A47C 17/12; B60N 2/4686
(Continued)

(56) References Cited

U.S. PATENT DOCUMENTS 1,802,620 A * 4/1931 Scully ................. B60N 2/4613
                                                                          297/113
1,907,322 A * 5/1933 Keicher .................... A47C 7/70
                                                                           108/33
(Continued)

*Primary Examiner* — David R Dunn
*Assistant Examiner* — Alexander Harrison
(74) *Attorney, Agent, or Firm* — Nixon & Vanderhye P.C.

(57) ABSTRACT

A seat is described which comprises a base arranged on a base structure, a backrest and structures for arm rest, wherein the seat comprises at least one retractable auxiliary support parallel to the base structure and rotationally slidable between an extended position with respect to the structure for arm rest and a retracted position with respect to the structure for arm rest, wherein in the retracted position the retractable support is totally inserted in the structure for arm rest.

9 Claims, 5 Drawing Sheets

(51) Int. Cl.
*A47C 7/54* (2006.01)
*A47C 1/12* (2006.01)
*B60N 3/00* (2006.01)

(58) Field of Classification Search
USPC .......... 297/145, 188.17, 188.16, 411.31, 116
See application file for complete search history.

(56) References Cited

U.S. PATENT DOCUMENTS

| | | | | |
|---|---|---|---|---|
| 2,500,398 | A * | 3/1950 | Bell | A47C 7/70 297/145 |
| 2,518,381 | A * | 8/1950 | Runkles | A47C 7/70 297/145 |
| 3,972,560 | A * | 8/1976 | White | A47B 83/02 108/40 |
| 4,040,659 | A * | 8/1977 | Arnold | A47B 31/06 297/188.17 |
| 4,417,764 | A * | 11/1983 | Marcus | B60N 3/102 108/44 |
| 4,834,449 | A * | 5/1989 | Engelman | A47B 3/14 108/134 |
| 5,372,403 | A * | 12/1994 | Puerto | A47C 1/03 297/145 |
| 5,584,534 | A * | 12/1996 | Kuranami | B60N 2/245 297/145 |
| 5,927,799 | A * | 7/1999 | Tornero | A47C 7/70 297/145 |
| 6,347,590 | B1 * | 2/2002 | D'Annunzio | B60N 3/002 108/25 |
| 7,874,614 | B2 * | 1/2011 | Figueras Mitjans | A47C 7/70 297/145 |
| 7,959,231 | B2 * | 6/2011 | Lee | B60N 2/46 244/118.5 |
| 8,336,956 | B2 * | 12/2012 | Westerink | B64D 11/06 108/44 |
| 8,596,206 | B2 * | 12/2013 | Legeay | B60N 3/002 108/137 |
| 2003/0071497 | A1 * | 4/2003 | Ballendat | A47C 7/70 297/145 |
| 2005/0258672 | A1 * | 11/2005 | Schweizer | A47C 7/70 297/145 |
| 2006/0220425 | A1 * | 10/2006 | Becker | B60N 3/002 297/188.16 |

* cited by examiner

SEAT COMPRISING A STRUCTURE FOR ARM SUPPORT

The present application claims priority to BR Patent Application No. 102013032476-0 filed Dec. 17, 2013, the entire content of which is hereby incorporated by reference.

invention refers to a seat, preferably for passenger transport vehicle, although it can be applied to pieces of furniture, cinema armchairs, among others; the said sit has a structure for arm rest which comprises, at least, one retractable auxiliary arm support, horizontally slidable between an extended position and a retracted position, in which the referred auxiliary support is totally inserted in the inside of the structure for arm rest.

DESCRIPTION OF THE STATE OF THE ART

Seats or armchairs have aim at providing an adequate accommodation to the passengers of a transport vehicle or occupants of any environment. Seats are also responsible for passengers/occupants to maintain a proper posture, having apparatuses which aid the accommodation of human body in the geometries of such seats.

In the case of static environments, such as halls, theaters or workplace, seats are responsible for providing comfort and an adequate accommodation position to the occupants, always taking into account ergonomics concepts.

In transport vehicles, besides comfort matters, seats have safety functions. On planes, buses, cars or vessels, seats are designed for accommodate occupants in moving vehicles. Moreover, they also have to be designed to withstand accidents and abnormal movements of these vehicles.

Among the apparatuses used to provide comfort and security in seats there is the armrest. In arrangements of two or more seats which have armrests, the middle armrest is usually shared. For instance, in environments having an arrangement with three or more adjacent seats situations in which the occupants of the edge seats occupy middle armrests may occur, restricting the comfort of the middle occupant.

Space limitation and the lack of individual support for the arm can also generate constraining situations related to the discomfort resulting from the physical contact between arms and bodies of the occupants of adjacent seats with a shared armrest. Hence, when designing the above-mentioned environments of common use it is important to provide conditions that ensure the occupant that his personal space will not be invaded by other occupants of the same environment.

Patent literature presents documents related to the present invention which are described below.

U.S. Pat. No. 7,506,930 describes an armrest support assembly for passenger seat set up to allow sharing of the referred armrest of passengers seated next to each other. The assembly for arm rest includes a laterally movable upper support panel, a detachable auxiliary arm support and an extensible elevated support. Assembly comprises a laterally extendible armrest which includes a lower panel and an upper panel adjusted to support the arm of a seated passenger, wherein when the upper panel is extended it jets out, increasing the effective width of the armrest.

Document US2012/025571 describes a seat for a transport vehicle comprising a seat surface, an armrest, and a child armrest. Child armrest is set up for both an adult position and a child position. In the set up for adults, child armrest is arranged in a retracted position, wherein the child armrest is incorporated in the contour of the main support. In the set up for children, child armrest is arranged in the position of use (extended) in which child armrest has a reduced spacing with respect to the seat along the vertical direction and has a reduced spacing with respect to the opposite support along the horizontal direction.

U.S. Pat. No. 1,500,524 describes an armrest especially for theater seats in which the referred armrest comprises means to provide an active position and an inactive position, wherein the said positions change by means of a hinge which allows the support to rotate between the horizontal and vertical positions.

Therefore, the above-described documents do not suggest or present a seat with a structure for passenger's arm rest in which the said structure comprises a retractable auxiliary support horizontally slidable between an extended position and a retracted position, in which the referred retractable auxiliary support is totally inserted inside the structure for arm rest; moreover it does not present a rotationally retractable auxiliary support which is fastened at a single fastening point.

OBJECTIVES OF THE INVENTION

The present invention aims at providing a seat as a structure for passengers' arm rest, especially used in transport vehicles, wherein the referred structure comprises at least one retractable auxiliary support, horizontally slidable between an extended position and a retracted position in which the retractable support is totally inserted inside the structure for arm rest.

BRIEF DESCRIPTION OF THE INVENTION

The subject matter of the present invention is a seat which consists of at least one base arranged on a base structure, backrest and structure for arm rest, wherein the seat comprises at least one retractable auxiliary support parallel to the base structure and rotationally slidable between an extended position with respect to the structure for arm rest, and a retracted position with respect to the structure for arm rest, wherein in the retracted position the retractable support is totally inserted in the structure for arm rest.

In a preferred embodiment the seat comprises the retractable auxiliary support fastened to the structure for arm rest at one single pivot adjacent to the backrest.

In a preferred embodiment the retractable auxiliary support comprises a series of support surfaces.

In a preferred embodiment the series of support surfaces defines a single horizontal plan parallel to the base structure.

These and other subject matters of the invention are presented below with descriptive sufficiency.

DETAILED DESCRIPTION OF THE INVENTION

The examples showed herein aim at exemplifying a number of manners to carry out the invention, without limiting the scope thereof.

Figure 1:
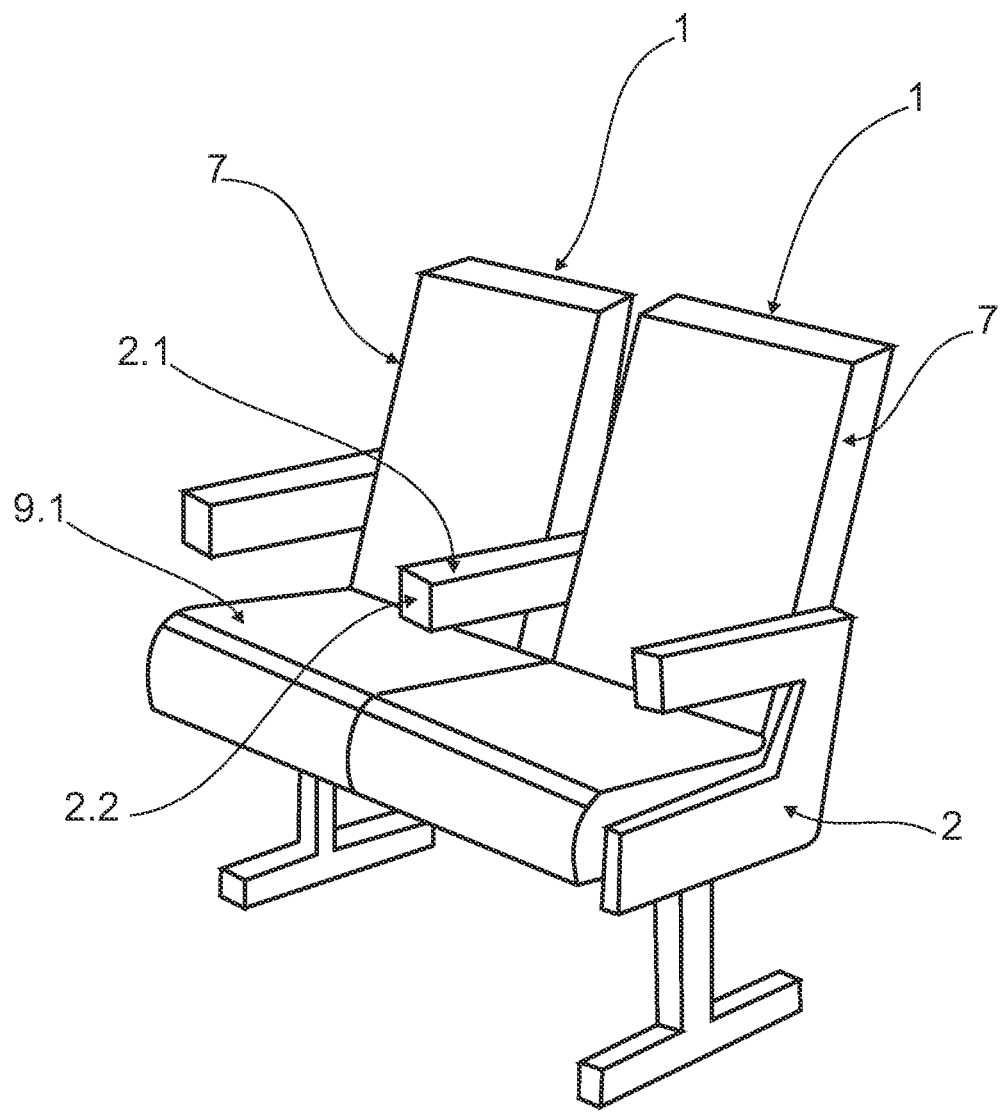
FIG. 1 illustrates a perspective view of a seat with a structure for arm rest.
Figure 2:
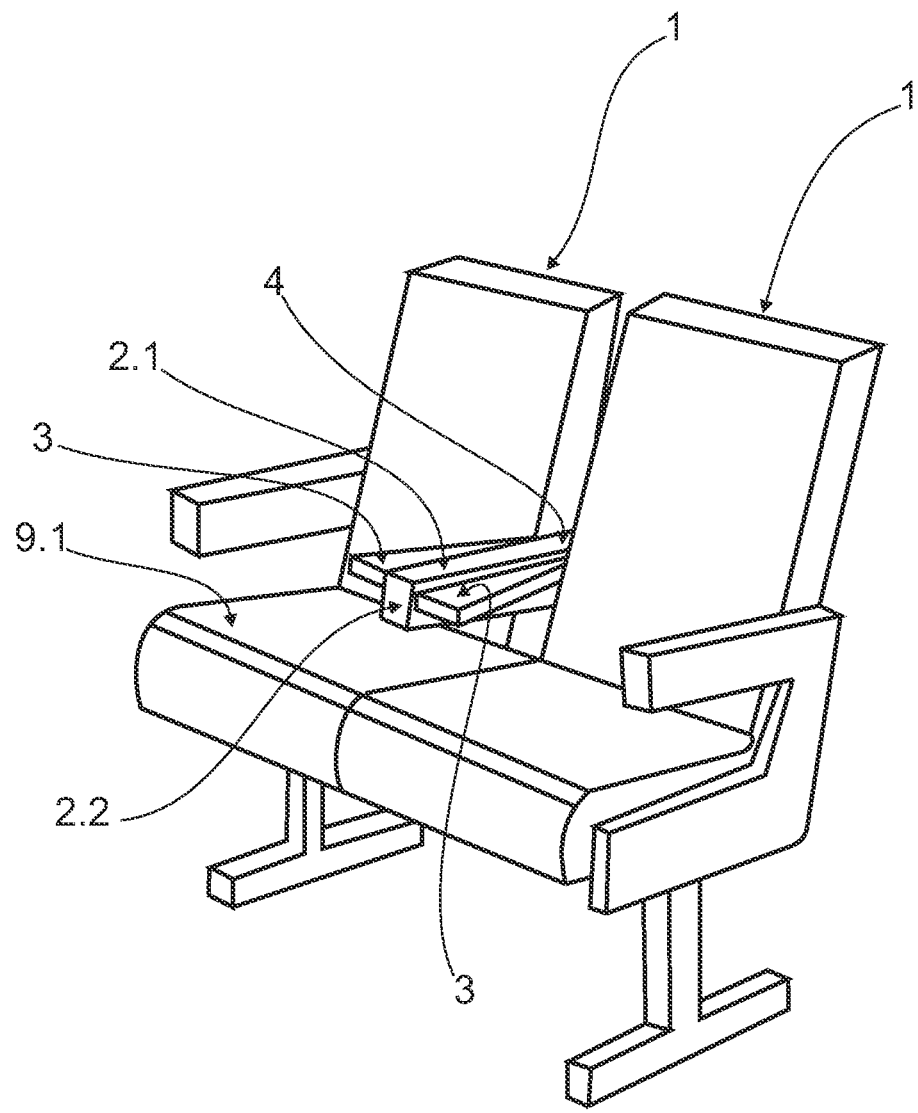
FIG. 2 illustrates a perspective view of a seat with a structure for arm rest comprising retractable auxiliary supports in an extended position.
Figure 3:
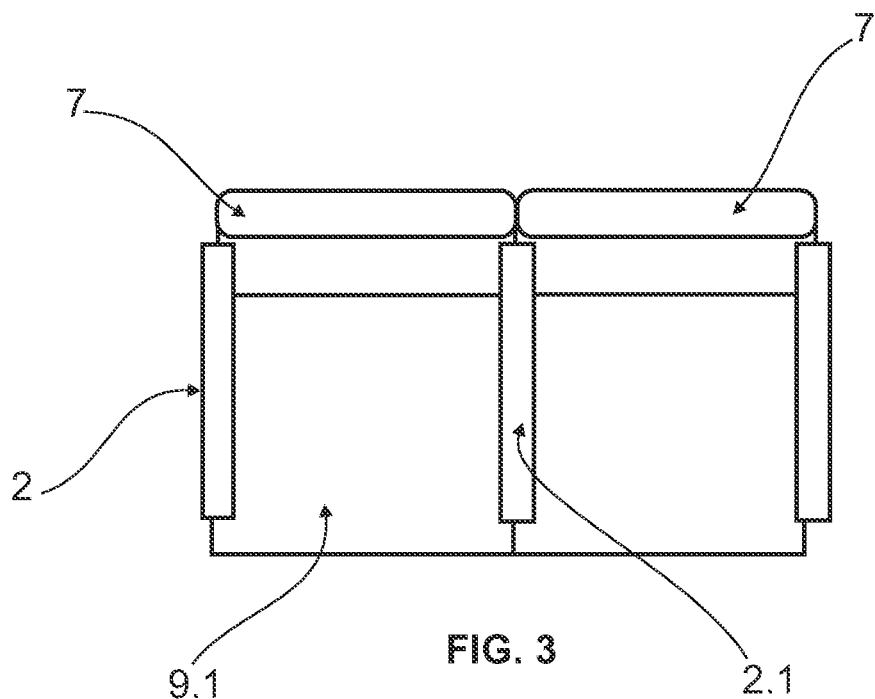
FIG. 3 illustrated a top view of a seat with a structure for arm rest.
Figure 4:
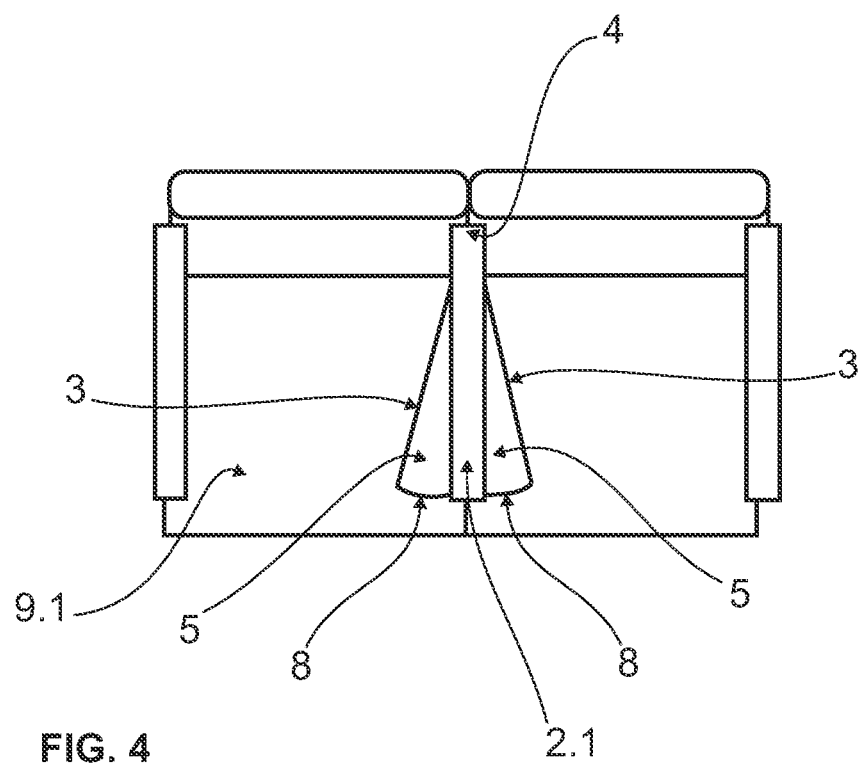
FIG. 4 illustrated a top view of a seat with a structure for arm rest comprising retractable auxiliary supports in an extended position.
Figure 5:
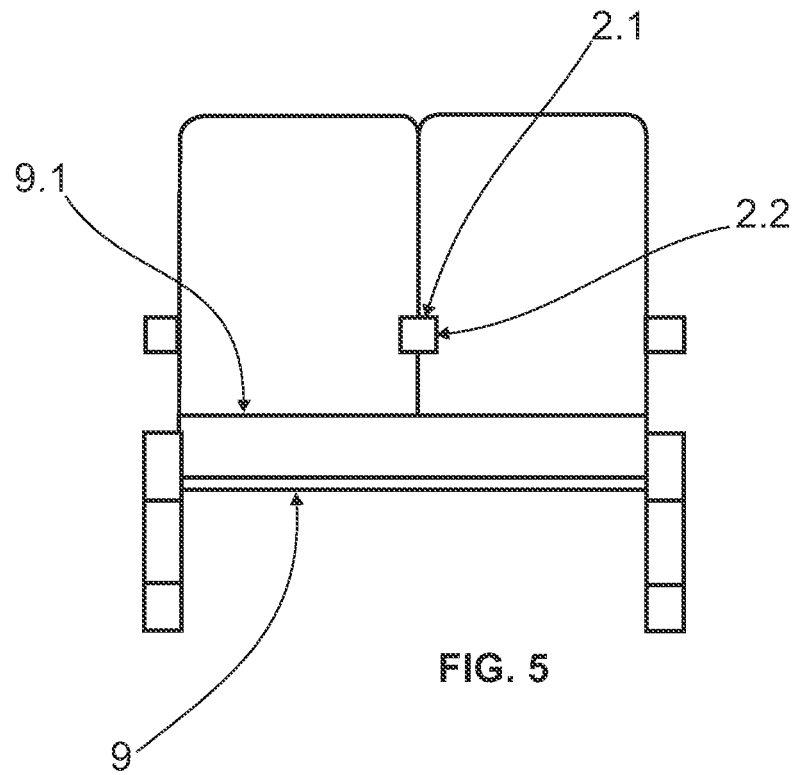
FIG. 5 illustrated a front view of a seat with a structure for arm rest
Figure 6:
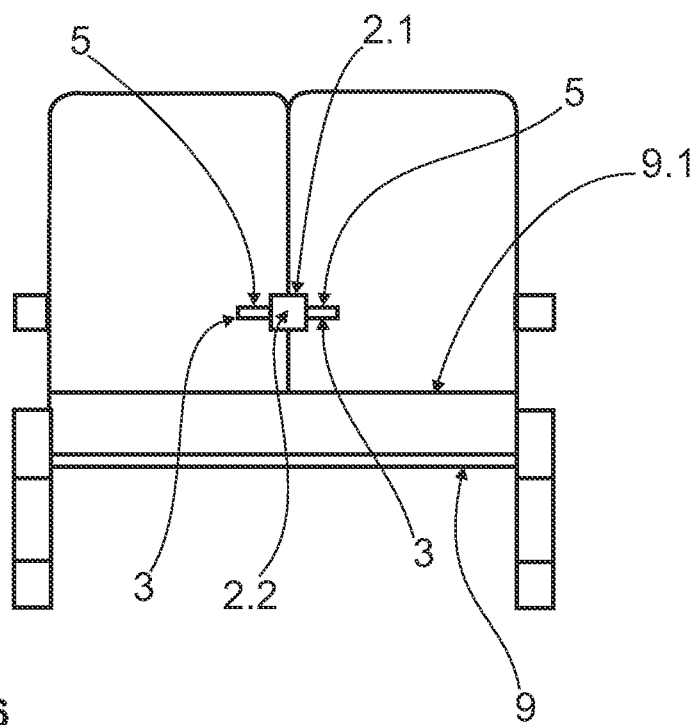
FIG. 6 illustrated a front view of a seat with a structure for arm rest comprising retractable auxiliary supports in an extended position.
Figure 7:
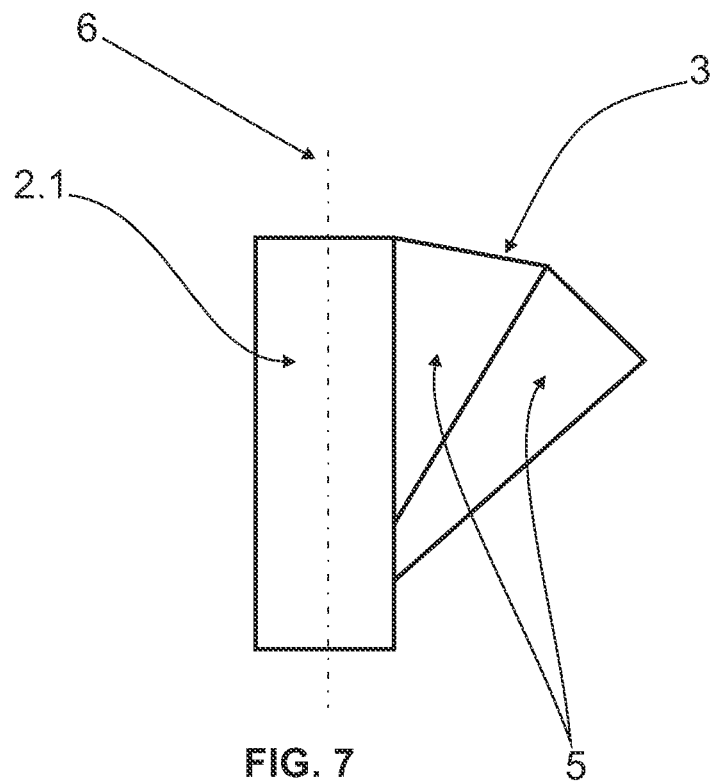
FIG. 7 illustrates the retractable auxiliary support in an extended position comprising two support surfaces.
Figure 8:
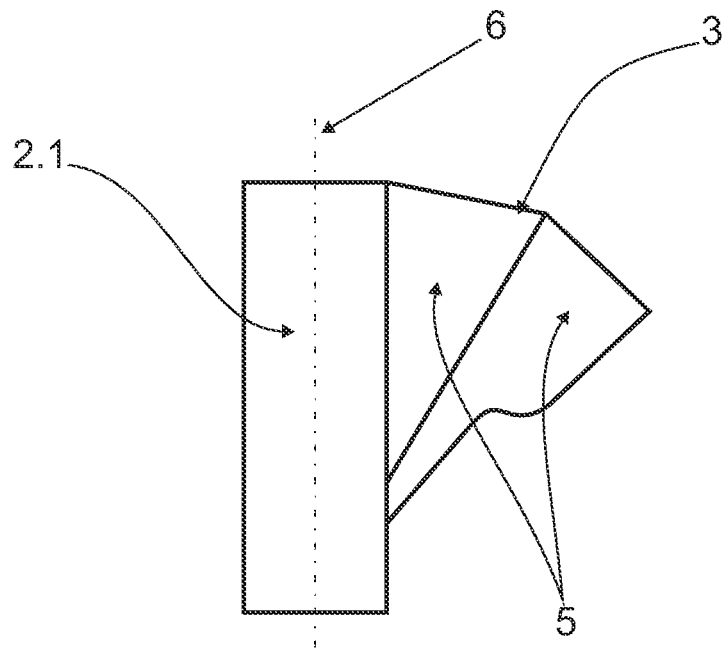
FIG. 8 the retractable auxiliary support in an extended position comprising two support surfaces which present a different geometry.

In conformity with one preferred embodiment and as it can be seen in FIGS. 1-8, seat 1, subject matter of this invention, comprises a base 9, a backrest 7 and structures for arm rest 2 whose goal is that of providing accommodation to occupants' arms.

Base 9.1 of seat 1 can have different formats in conformity with seat 1, however, this base 9.1 is placed on base structure 9, parallel to the floor where seat 1 is installed. The function of base structure 9 is that of giving structural support to base 9.1 so that this can withstand the weight applied on it when seat 1 is occupied by a user. Thus, base structure 9 works as a stand or support which receives base 9.1 in its different formats, providing a safe support of this base 9.1 and of the occupant of the seat.

Seat 1 may be single or flanked by other similar seats 1. When seat 1 is flanked by others seats 1, the structure for arm rest 2 presents a middle support shared within two seats 1.

This structure for arm rest 2 is especially fastened to base structure 9 and projected upwards, adjacent to backrest 7. The structure presents a support region 2.1 in which users rest their arms. Preferably, the structure for arm support 2 comprises a body 2.2 placed beneath support region 2.1. This body 2.2 defines an inner hollow volume.

A retractile auxiliary support 3 parallel to the base structure 9 is arranged in the structure for arm rest 2, inside the body 2.2 and immediately beneath the support region 2.1. This retractable auxiliary support 3 is fastened to body 2.2 of the structure for arm rest 2, preferably, at a single pivot point 4 adjacent to backrest 7.

Hence, retractable auxiliary support 3 is rotationally slidable between an extended position with respect to the structure for arm rest 2 and a retracted position with respect to the structure for arm rest 2.

In the retracted position, retractable auxiliary support 3 is fully inserted inside body 2.2 of structure for arm rest 2, while in the extended position, retractable auxiliary support 3 is projected outwards from structure for arm rest 2, more specifically, laterally projected outwards from body 2.2. The extended position is characterized as the active position of retractable auxiliary support 3.

Break means in an extended position and/or in a retracted position may be provided to secure the position of auxiliary supports 3.

In a preferred embodiment, retractable auxiliary support 3 is split with respect to its longitudinal axis 6, and defines, especially, two similar halves.

In the specific case of structure for arm rest 2 shared between seats 1, each half of retractable auxiliary support 3 projects from the structure for arm rest 2 towards the space occupied by seat 1. In this case, o auxiliary support 3 is accessible and available for both the occupants of adjacent armchairs in an independent fashion, that is, in case one of the sides desires to use retractable auxiliary support 3, the opposite side can remain retracted.

In a preferred embodiment of flanking seats 1, besides the structure for arm rest 2 central, also the structures for arm rest 2 of the edges of seats 1, which are not shared, can comprise retractable auxiliary supports 3 to enhance agronomics. In this set up, each retractable auxiliary support 3 is independent. Optionally seat 1 can comprise means for synchronized and simultaneous adjusting between auxiliary supports 3 arranged in different structures for arm rest 2, in a way to create movement dependency between them.

Furthermore, pivot point 4 which fastens retractable auxiliary support 3 to body 2.2 of structure for arm rest 2 may comprise: screw, housing, rivet, nut, screw thread, pin, or any element which provides adequate fastening to auxiliary support 3.

In a preferred embodiment, pivot element 4 used must allow retractable auxiliary support 3 to rotate.

As described, such pivot point 4 is adjacent to backrest 7 of seat 1, thus, the projected portion of retractable auxiliary support 3 is larger by the extremity of the occupant's arm and smaller by the occupant's elbow.

Such rotation of retractable auxiliary support 3 defines an arch 8 whose amplitude varies in conformity with the sizes of the project of seat 1. Moreover, adjusting means allow the user to adjust the projection of auxiliary supports 3 as needed.

Furthermore, retractable auxiliary support 3 characterizes at least one support surface 5 which is projected when retractable auxiliary support 3 is in the extended position. In a preferred embodiment, retractable auxiliary support 3 comprises a series of support surfaces 5, which define a single horizontal plane parallel to base structure 9. The user can rest his arm on such support surface 5.

In this embodiment support surfaces 5 have a common axis at fastening point 4 so that each support surface 5 defines an arch 8 of different amplitude with respect to fastening point 4. Thus, surfaces 5 level when they are in an extended position, although they overlap when they are in a retracted position.

In a preferred embodiment, the auxiliary apparatuses for object support can be applied to the retractable auxiliary support 3. Among such objects let us mention: coasters, pen holders, cell phones, wallets, etc.

The present invention presents a series of advantages: it is applicable in any type of seat, it enhances space use, it provides higher comfort to the occupants of the adjacent seats and a fully retractable auxiliary support.

Despite a preferred example of embodiment has been described, the scope of the present invention includes other possible variations, as it is only limited by the content of its claims, which include the possible equivalents.

The invention claimed is:

1. A seat assembly comprising:
    a seat base structure which comprises a pair of flanking seats each having a seat bottom and a seat backrest extending upwardly from the seat bottom;
    an arm rest connected to the seat base structure and positioned between the pair of flanking seats; and
    a pair of opposed retractable auxiliary supports disposed substantially parallel to the seat bottom and operatively associated with the arm rest, wherein
    the retractable auxiliary supports are pivotally attached at a rear end thereof adjacent to the backrest of the seats by a single pivot point to allow the auxiliary supports to be pivotally moveable about the single pivot point in opposite relative directions between (i) an extended position such that forward ends of the auxiliary supports radially extend from the pivot point and are exposed laterally of the arm rest, and (ii) a retracted position wherein the forward ends of the retractable auxiliary supports are insertably housed within the arm rest, and wherein the retractable auxiliary supports comprise a series of support surfaces each being pivotally connected to the arm rest at the single pivot point so as to be pivotally movable between the extended and retracted positions.

2. The seat assembly as in claim 1, wherein the series of support surfaces defines a single horizontal plane substantially parallel to the seat base when in the extended position thereof.

3. The seat assembly as in claim 2, wherein the series of support surfaces overlap one another when in the retracted position thereof.

4. The seat assembly as in claim 1, wherein the forward ends of the retractable auxiliary supports define an arch.

5. A seat assembly comprising:
a seat base structure which comprises a pair of flanking seats each having a seat bottom and a seat backrest extending upwardly from the seat bottom;
an arm rest connected to the seat base structure and positioned between the pair of flanking seats; and
a pair of opposed retractable auxiliary supports disposed substantially parallel to the seat bottom and operatively associated with the arm rest, wherein
the retractable auxiliary supports are pivotally attached at a rear end thereof adjacent to the backrest of the seats by a single pivot point to allow the auxiliary supports to be pivotally moveable about the single pivot point in opposite relative directions between (i) an extended position such that forward ends of the auxiliary supports radially extend from the pivot point and are exposed laterally of the arm rest, and (ii) a retracted position wherein the forward ends of the retractable auxiliary supports are insertably housed within the arm rest, and wherein each of the retractable auxiliary supports includes an inner support surface and an outer support surface each being pivotally connected to the arm rest at rear ends thereof at the single pivot point so as to be movable between the extended and retracted positions relative to the arm rest, wherein the inner and outer support surfaces are level with one another when in the extended position thereof, and overlap one another when in the retracted position thereof.

6. The seat assembly as in claim 5, wherein the retractable auxiliary supports comprise a series of support surfaces each being pivotally connected to the arm rest at the single pivot point so as to be pivotally movable between the extended and retracted positions.

7. The seat assembly as in claim 6, wherein the series of support surfaces defines a single horizontal plane substantially parallel to the seat base when in the extended position thereof.

8. The seat assembly as in claim 7, wherein the series of support surfaces overlap one another when in the retracted position thereof.

9. The seat assembly as in claim 5, wherein the forward ends of the retractable auxiliary supports define an arch.

\* \* \* \* \*